(12) United States Patent
Chiben et al.

(10) Patent No.: US 11,481,488 B2
(45) Date of Patent: Oct. 25, 2022

(54) AUTOMATED SECURITY ALGORITHM IDENTIFICATION FOR SOFTWARE DISTRIBUTIONS

(71) Applicant: Red Hat, Inc., Raleigh, NC (US)

(72) Inventors: Pierre-Yves Chiben, Paris la Defense (FR); Leigh Griffin, Waterford City (IE)

(73) Assignee: Red Hat, Inc., Raleigh, NC (US)

( * ) Notice: Subject to any disclaimer, the term of this patent is extended or adjusted under 35 U.S.C. 154(b) by 177 days.

(21) Appl. No.: 16/856,423

(22) Filed: Apr. 23, 2020

(65) Prior Publication Data

US 2021/0334367 A1 Oct. 28, 2021

(51) Int. Cl.
*G06F 21/55* (2013.01)
*G06F 11/36* (2006.01)

(52) U.S. Cl.
CPC ........ *G06F 21/554* (2013.01); *G06F 11/3604* (2013.01)

(58) Field of Classification Search
CPC ............... G06F 21/554; G06F 11/3604; G06F 2221/033; G06F 21/57
See application file for complete search history.

(56) References Cited

U.S. PATENT DOCUMENTS

| | | | |
|---|---|---|---|
| 8,352,935 B2 | 1/2013 | Isaacson et al. | |
| 9,323,923 B2 * | 4/2016 | Cecchetti | G06F 8/70 |
| 9,678,737 B2 | 6/2017 | Wei et al. | |
| 9,886,303 B2 | 2/2018 | Koller Jemio et al. | |
| 10,268,825 B2 * | 4/2019 | Holz | G06F 21/577 |
| 2015/0332053 A1 * | 11/2015 | Bhattacharya | G06F 21/577 726/25 |
| 2018/0121314 A1 * | 5/2018 | Hardee | G06F 8/43 |
| 2021/0256122 A1 * | 8/2021 | Vaithiyanathan | G06F 8/72 |

OTHER PUBLICATIONS

Cesare, Silvio, "Clonewise-Automatically Detecting Package Clones and Inferring Security Vulnerabilities", Deakin University, accessed Mar. 11, 2020, 8 pages.

(Continued)

*Primary Examiner* — Christopher A Revak
(74) *Attorney, Agent, or Firm* — Dority & Manning, P.A.

(57) ABSTRACT

Providing automated security algorithm identification in software distributions is disclosed herein. In one example, a processor device receives a source code fragment representing a difference between a given source code file of a first software distribution and a corresponding source code file of a second software distribution. The processor device determines whether the source code fragment matches any security profile of one or more security profiles that each corresponds to an approved security algorithm. If so, the processor device generates an approval notification to indicate that the source code fragment comprises the approved security algorithm. However, if the processor device determines that the source code fragment does not match any security profile of the one or more security profiles, the processor device generates a warning notification. In this manner, preparation of software distributions may be performed more efficiently and reliably, and with decreased overhead relative to manual security algorithm identification.

20 Claims, 8 Drawing Sheets

(56) References Cited

OTHER PUBLICATIONS

Mauczka, Andreas et al., "Mining Security Changes in FreeBSD", Research Group for Industrial Software, Vienna University of Technology, 1040, Austria, IEEE, May 2-3, 2010, 4 pages.

Neuhaus, Stephan, et al., "The Beauty and the Beast: Vulnerabilities in Red Hat's Packages", Department of Computer Science and Telecommunications, University of Trento, Italy; Microsoft Research, One Microsoft Way, Redmond, Washington, USA, accessed Mar. 11, 2020, 14 pages.

Sandecki, Lech, "How Ubuntu Advantage for Infrastructure Delivers Top-Notch Linux Security ", Canonical Ltd, https://ubuntu.com/blog/how-ubuntu-advantage-delivers-top-notch-linux-security, Oct. 22, 2019, 3 pages.

Stuckman, Jeffrey, et al., "Mining Security Vulnerabilities from Linux Distribution Metadata", Dept. of Computer. Sci., Univ. of Maryland, College Park, MD, USA, 2014 IEEE International Symposium on Software Reliability Engineering Workshops, Nov. 3-6, 2014, 6 pages.

\* cited by examiner

AUTOMATED SECURITY ALGORITHM IDENTIFICATION FOR SOFTWARE DISTRIBUTIONS

BACKGROUND

As the source code files for a given version of a software distribution are updated relative to an earlier version of the software distribution, business and/or legal considerations may require the software distributor to identify any new security algorithms that may have been incorporated into the software distribution. For instance, the software distributor may need to ensure that any newly added security algorithms comply with export controls, and/or are free of identified vulnerabilities. Conventional approaches for identification of security algorithms in a software distribution involve manual tasks performed by a software packager, and may introduce security risks and increase the overhead associated with preparing the software distribution.

SUMMARY

The examples disclosed herein relate to providing automated security algorithm identification in software distributions. In one example, a processor device receives a source code fragment that represents a difference between a given source code file of a first software distribution and a corresponding source code file of a second software distribution (e.g., a preceding version of the first software distribution). In some examples, the source code fragment may be generated using a file differencing operation performed on source code files of the first software distribution and the second software distribution. The processor device compares the source code fragment with one or more security profiles that each corresponds to an approved security algorithm. Each of the security profiles may include, as non-limiting examples, an identifier of the corresponding security algorithm, a classification of the corresponding security algorithm, an exemplary code fragment illustrating an implementation of the corresponding security algorithm, a programming language identifier indicating a programming language in which the exemplary code fragment is implemented, and/or a programming paradigm identifier indicating a programming paradigm in which the exemplary code fragment is implemented.

If the processor device determines that the source code fragment matches any security profile of the one or more security profiles, the processor device generates an approval notification (e.g., to a continuous integration (CI) system, as a non-limiting example) to indicate that the source code fragment comprises the approved security algorithm. However, if the processor device determines that the source code fragment does not match any security profile of the one or more security profiles, the processor device generates a warning notification (e.g., to a CI system and/or to a developer, as non-limiting examples). In this manner, the process for preparing software distributions may be performed more efficiently and reliably, and with decreased overhead relative to manual security algorithm identification.

In another example, a method is disclosed. The method comprises receiving, by a first processor device, a first source code fragment representing a difference between a first source code file of a first software distribution and a second source code file of a second software distribution. The method further comprises determining that the first source code fragment matches any security profile of one or more security profiles, wherein each security profile of the one or more security profiles corresponds to an approved security algorithm. The method also comprises, responsive to determining that the first source code fragment matches any security profile of the one or more security profiles, generating an approval notification indicating that the first source code fragment comprises the approved security algorithm.

In another example, a computing system is disclosed. The computing system comprises a first computing device that comprises a first memory and a first processor device coupled to the first memory. The first processor device is to receive a first source code fragment representing a difference between a first source code file of a first software distribution and a second source code file of a second software distribution. The first processor device is further to determine that the first source code fragment matches any security profile of one or more security profiles, wherein each security profile of the one or more security profiles corresponds to an approved security algorithm. The first processor device is also to, responsive to determining that the first source code fragment matches any security profile of the one or more security profiles, generate an approval notification indicating that the first source code fragment comprises the approved security algorithm.

In another example, a computer program product is provided. The computer program product is stored on a non-transitory computer-readable storage medium, and includes computer-executable instructions to cause a processor device to receive a first source code fragment representing a difference between a first source code file of a first software distribution and a second source code file of a second software distribution. The computer-executable instructions further cause the processor device to determine that the first source code fragment matches any security profile of one or more security profiles, wherein each security profile of the one or more security profiles corresponds to an approved security algorithm. The computer-executable instructions also cause the processor device to, responsive to determining that the first source code fragment matches any security profile of the one or more security profiles, generate an approval notification indicating that the first source code fragment comprises the approved security algorithm.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

As used herein, a "software distribution" (or "distro") refers to a version-specific collection of software components that may include, as non-limiting examples, one or more source code files, one or more executable binary files, and a file list or manifest that indicates the contents of the software distribution. In some examples, a software distribution may be contained within and embodied by a compressed archive such as a ZIP or TAR archive (or "tarball"), and may be stored in a repository along with previous versions of the software distribution, if any. Software distributions provide a convenient mechanism for storing and delivering all files necessary to compile, install, and/or execute a software application. Examples of software distributions include Linux-based distros such as those provided by Red Hat®.

A software distribution may incorporate any of a wide variety of security algorithms (such as Triple Data Encryption Standard (DES), RSA, Blowfish, Twofish, and Advanced Encryption Standard, as non-limiting examples) that can used for cryptographic, authentication, and/or encryption purposes by the software distribution. Business and/or legal considerations may require a software distributor to ensure that the security algorithms that have been incorporated into the software distribution comply with export controls, and/or are free of known vulnerabilities. Consequently, one aspect of preparing and packaging a new version of a software distribution involves identifying any security algorithms that may have been newly incorporated into the software distribution relative to a previous version of the software distribution. However, conventional approaches for identifying security algorithms within a software distribution involve tasks that are performed manually by a software packager. Such manual review and identification of security algorithms may introduce additional security risks, and further may increase the overhead associated with preparing the software distribution.

In this regard, examples disclosed herein relate to providing automated security algorithm identification in software distributions. In one example, a processor device receives a source code fragment that represents a difference between a first source code file of a first software distribution and a corresponding second source code file of a second software distribution (e.g., a preceding version of the first software distribution, as a non-limiting example). In some examples, the source code fragment may be generated using a file differencing operation performed on the first source code files and the second source code file. The processor device then compares the source code fragment with one or more security profiles that each corresponds to an approved security algorithm. Each of the security profiles may include, as non-limiting examples, attributes such as an identifier of the corresponding security algorithm, a classification of the corresponding security algorithm, an exemplary code fragment illustrating an implementation of the corresponding security algorithm, a programming language identifier indicating a programming language in which the exemplary code fragment is implemented, and/or a programming paradigm identifier indicating a programming paradigm in which the exemplary code fragment is implemented.

If the processor device determines that the source code fragment matches any security profile of the one or more security profiles, the processor device generates an approval notification (e.g., an automated notification to a continuous integration (CI) system, as a non-limiting example) to indicate that the source code fragment comprises the approved security algorithm. However, if the processor device determines that the source code fragment does not match any security profile of the one or more security profiles, the processor device generates a warning notification (e.g., an automated notification to a CI system and/or an automated communication such as an email or a text message to a developer, as non-limiting examples). In this manner, the process for preparing software distributions may be performed more efficiently and reliably, and with decreased overhead relative to manual security algorithm identification.

Some examples may provide that the processor device, upon determining that the source code fragment does not match any of the security profiles, may automatically generate a new security profile that corresponds to the source code fragment. The new security profile may be based on attributes of the source code fragment that are identified by the processor device, and may be added to the one or more security profiles for future use in automatically identifying security algorithms.

According to some examples, the operations for providing automated security algorithm identification described above may be preceded by operations for preparing the source code fragment for analysis. In such examples, a second processor device (i.e., either the same processor device referenced above or a different processor device) may receive a compressed archive that includes the first source code file of the first software distribution, and may decompress the first source code file from the compressed archive. The second processor device may then determine (e.g., based on indexing the first software distribution using an indexing service) that the second software distribution exists in a repository, and, in response, may generate the first source code fragment using a file differencing operation on the first source code file and the second source code file.

Some examples may provide that operations for determining whether the source code fragment matches any security profile of the one or more security profiles include comparing an attribute of the source code fragment with a corresponding attribute of each security profile of the one or more security profiles. In some examples, the source code fragment may be considered to match a security profile only if all attributes of the source code fragment match all attributes of the security profile, while some examples may consider the source code fragment to match the security profile if some predefined threshold number of attributes of the security profile are satisfied by the source code fragment. In some examples, a machine language model may be used to determine whether the source code fragment matches any of the security profiles. In such examples, the machine language model may first be trained in conventional fashion using exemplary code fragments for each of the security profiles. Subsequently, the processor device may determine whether the source code fragment matches any security profile of the one or more security profiles by applying the machine language model to the source code fragment to determine whether the machine language model identifies the source code fragment as corresponding to a security profile of the one or more security profiles.

Figure 1:
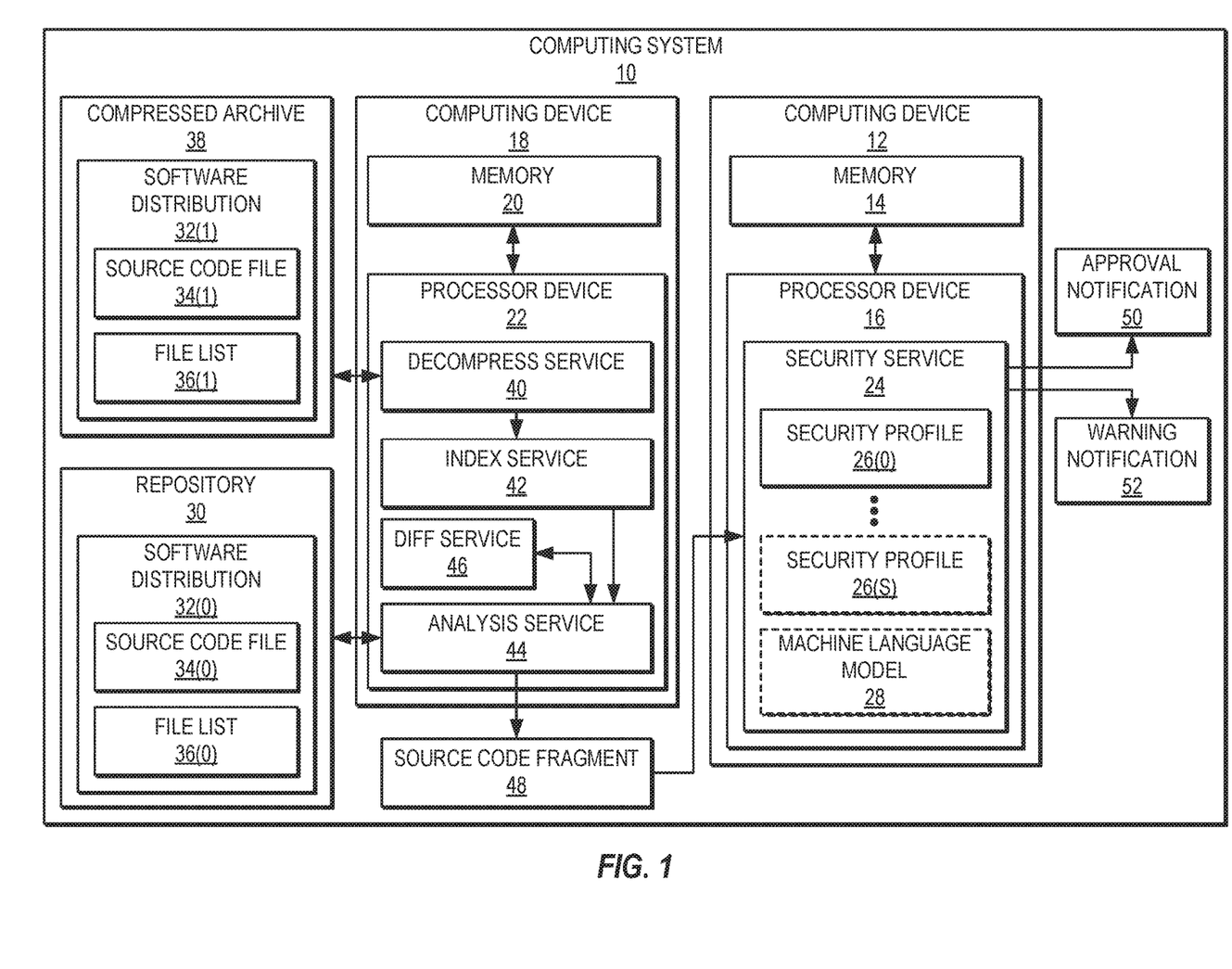
FIG. 1 is a block diagram of a computing system in which examples may be practiced.

To illustrate a computing system in which examples may be practiced, FIG. 1 is provided. In the example of FIG. 1, a computing system 10 provides a computing device 12 (i.e., "first computing device 12") that includes a memory 14 and a processor device 16, and also provides a computing device 18 (i.e., "second computing device 18") that includes a memory 20 and a processor device 22. The computing system 10 of FIG. 1 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing system 10 may include more or fewer elements than illustrated in FIG. 1. For example, the processor devices 16 and 22 each may further include one or more functional units, instruction caches, unified caches, memory controllers, interconnect buses, and/ or additional memory devices, caches, and/or controller circuits, which are omitted from FIG. 1 for the sake of clarity. It is to be further understood that, while FIG. 1 illustrates two computing devices 12 and 18, in some examples the constituent elements of the computing devices 12 and 18 and the operations attributed thereto may be embodied as a single computing device, or may be distributed over more than the two computing devices 12 and 18 shown in FIG. 1.

As seen in FIG. 1, the processor device 16 executes a security service 24 that is responsible for performing operations for providing automated security algorithm identification. Accordingly, the security service 24 provides one or more security profiles 26(0)-26(S), each corresponding to an approved security algorithm (i.e., a known security algorithm that has been approved for inclusion within software distributions). As discussed in greater detail with respect to FIG. 2, each of the security profile(s) 26(0)-26(S) may specify attributes that correspond to the approved security algorithm, and that may be compared with attributes of a source code fragment to determine whether the source code fragment contains the approved security algorithm.

In some examples, the security service 24 may further include a machine language model 28 that is trained in conventional fashion using exemplary code fragments for each of the one or more security profiles 26(0)-26(S). The machine language model 28 may comprise, as non-limiting examples, one or more of a non-linear regression algorithm, a regression tree, and a neural network. In such examples, if attributes of the source code fragment do not exactly match any of the one or more security profiles 26(0)-26(S) (because, for instance, the programming languages used in each are different), the machine language model 28 may be applied to the source code fragment to further attempt to determine whether the source code fragment can be matched with one of the security profile(s) 26(0)-26(S). For example, it is known that object-oriented languages tend to share similar traits and programming conventions. Accordingly, the machine language model 28 may be able to match a source code fragment written in one object-oriented language, such as Java, with a security profile 26(0)-26(S) corresponding to an approved security algorithm written in another object-oriented language, such as Python.

The computing system 10 in the example of FIG. 1 further provides a repository 30, which comprises a storage location for a software distribution 32(0) that includes a source code file 34(0) and a file list 36(0). In some examples, the repository 30 may comprise a computing device separate from the computing devices 12 and 18, while some examples may provide that the repository 30 is provided by the computing device 18 or the computing device 12. For the sake of clarity, the software distribution 32(0) is shown as including only the single source code file 34(0). However, it is to be understood that the software distribution 32(0) may include source code files, executable binary files, and/or other application resource files in addition to the source code file 34(0).

In exemplary operation, the processor device 22 of the computing device 18 receives a compressed archive 38 that stores a compressed version of a software distribution 32(1) that comprises a source code file 34(1) and a file list 36(1). The compressed archive 38 may be manually submitted to the processor device 22, or may be automatically retrieved by the processor device 22 from a data store (not shown). The processor device 22 first passes the compressed archive 38 to a decompress service 40 executed by the processor device 22. The decompress service 40 decompresses the source code file 34(1), and passes the source code file 34(1) to an index service 42, which performs indexing on the source code file 34(1). Based on the indexing, an analysis service 44 of the processor device 22 contacts the repository 30 and determines that the repository 30 contains the software distribution 32(0), which in this example is a preceding version of the software distribution 32(1).

The analysis service 44 retrieves the software distribution 32(0) from the repository 30, and then passes the source code file 34(0) and the source code file 34(1) to a file differencing service ("diff service") 46. The diff service 46 performs a file differencing operation to generate a source code fragment 48 representing the differences in source code between the source code file 34(0) and the source code file 34(1). If the source code file 34(1) contains any security algorithms that are new relative to the source code file 34(0), the source code fragment 48 will contain the newly added security algorithm.

The source code fragment 48 is then passed to the security service 24 executed by the processor device 16 of the computing device 12. After receiving the source code fragment 48, the security service 24 determines whether the source code fragment 48 matches any security profile of the one or more security profiles 26(0)-26(S). If so, the security service 24 generates an approval notification 50 that indicates that the source code fragment 48 comprises an approved security algorithm corresponding to one of the security profile(s) 26(0)-26(S). If not, the security service 24 generates a warning notification 52 to indicate that the source code fragment comprises an unrecognized algorithm. The approval notification 50 and the warning notification 52 according to some examples are discussed in greater detail below with respect to FIG. 3.

In some examples, if the security service 24 determines that the source code fragment 48 does not match any security profile of the one or more security profiles 26(0)-26(S), the processor device 16 may generate a new security profile 26(i) (not shown) based on the source code fragment 48. For example, the processor device 16 may automatically identify attributes of the source code fragment 48, and may populate the new security profile 26(i) based on the identified attributes.

Figure 2:
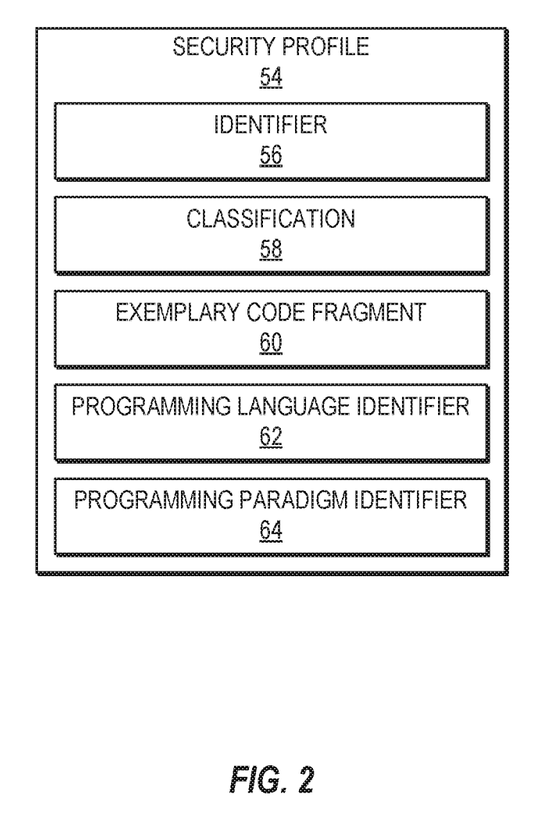
FIG. 2 is a block diagram illustrating exemplary attributes of a security profile of the computing system of FIG. 1, according to one example.

To illustrate exemplary attributes of one of the security profile(s) 26(0)-26(S) of FIG. 1 according to one example, FIG. 2 is provided. In FIG. 2, a security profile 54, corresponding in functionality to the security profile(s) 26(0)-26(S) of FIG. 1, is shown. The security profile 54 includes an identifier 56 of the approved security algorithm that corresponds to the security profile 54. The identifier 56 may comprise, as non-limiting examples, a name or other designation for the corresponding approved security algorithm. The security profile 54 also includes a classification 58 of the approved security algorithm corresponding to the security profile 54. The classification 58 may comprise, as non-limiting examples, an indication of whether the approved security algorithm is a symmetric algorithm or an asymmetric algorithm, a number of bits used by keys of the approved security algorithm, and/or the like.

As seen in FIG. 2, the security profile 54 may also include sample code and associated attributes for the approved security algorithm corresponding to the security profile 54. In this regard, the security profile 54 includes an exemplary code fragment 60, which may comprise source code for one implementation of the approved security algorithm. The security profile 54 also includes a programming language identifier 62 that indicates the programming language in which the exemplary code fragment 60 is implemented, as well as a programming paradigm identifier 64 that indicates the programming paradigm (e.g., procedural, object-oriented, functional, and the like, as non-limiting examples) in which the exemplary code fragment 60 is implemented. It is to be understood that, in some examples, the security profile 54 may contain more or fewer attributes than those illustrated in FIG. 2.

Figure 3:
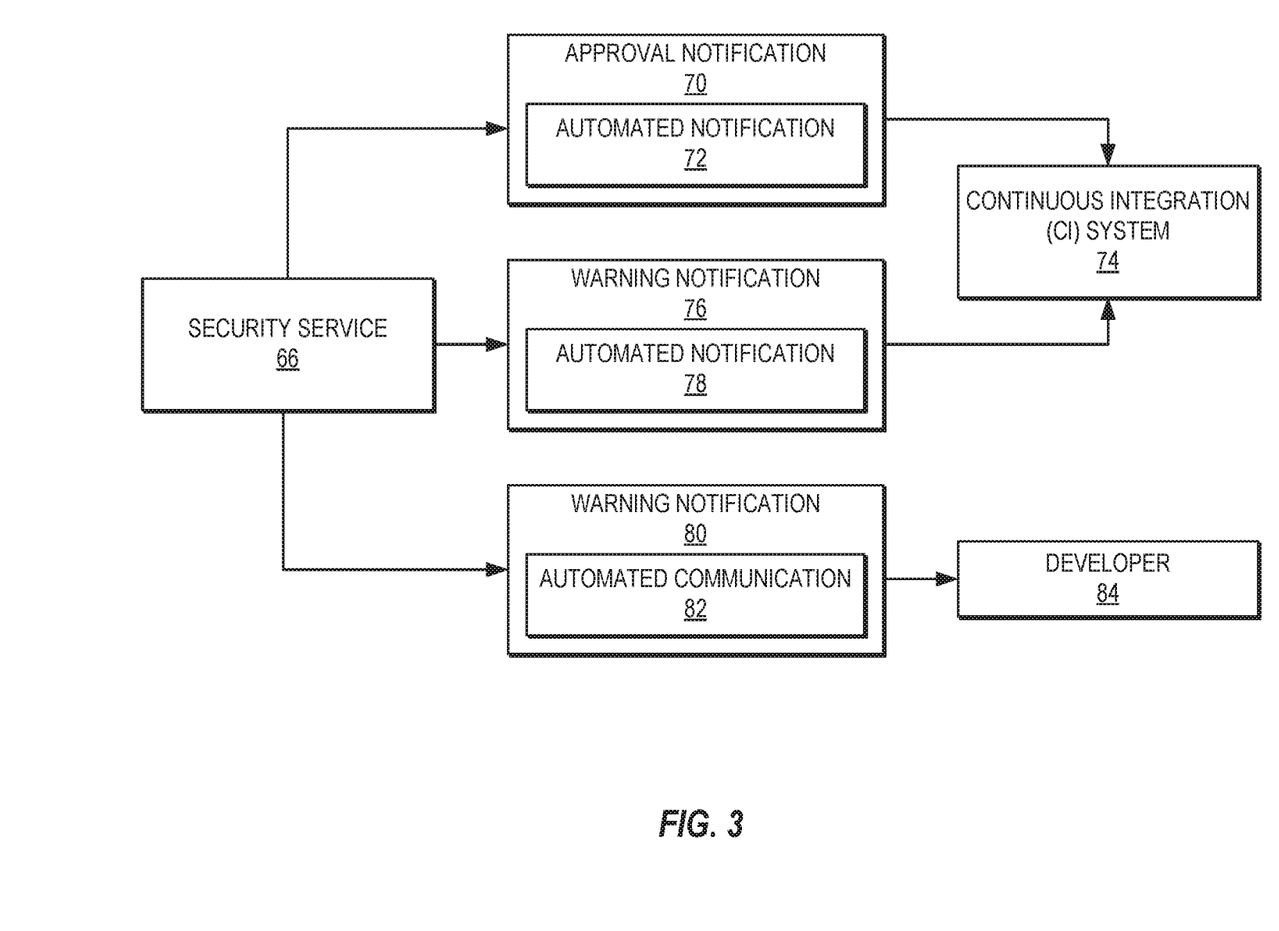
FIG. 3 is a block diagram illustrating exemplary contents of the approval notification and the warning notification of the computing system of FIG. 1, according to one example.

As discussed above, the processor device 16 of FIG. 1 (e.g., using the security service 24) may generate the approval notification 50 in response to the source code fragment 48 matching one of the security profile(s) 26(0)-26(S), and may generate the warning notification 52 in response to the source code fragment 48 not matching any of the security profile(s) 26(0)-26(S). Accordingly, to illustrate exemplary contents of the approval notification 50 and the warning notification 52 according to some examples, FIG. 3 is provided. In FIG. 3, a security service 66, corresponding in functionality to the security service 24 of FIG. 1, is shown. In response to determining that a source code fragment (not shown) matches a security profile such as one of the security profile(s) 26(0)-26(S), the security service 66 may generate and send an approval notification 70 (corresponding to the approval notification 50 of FIG. 1). The approval notification 70 comprises an automated notification 72 to a CI system 74, which may be provided by or coupled to the computing system 10 of FIG. 1 to enable continuous integration (i.e., a software engineering practice in which code is frequently copied from a shared code base, modified to add new features and/or to correct known issues, and then re-integrated into the shared code base). The automated notification 72 sent by the security service 66 as part of the approval notification 70 may indicate to the CI system 74 that the source code fragment in question is safe to re-integrate into the shared code base.

Conversely, if the security service 66 determines that a source fragment does not match any of the security profile(s) 26(0)-26(S), the security service 66 may send a warning notification 76 (corresponding to the warning notification 52 of FIG. 1) that comprises an automated notification 78 to the CI system 74. The automated notification 78 sent by the security service 66 as part of the warning notification 76 may indicate to the CI system 74 that the source code fragment in question may not be safe to re-integrate into the shared code base. The security service 66 may also send a warning notification 80 (also corresponding to the warning notification 52 of FIG. 1) comprising an automated communication 82 to a developer 84. The automated communication 82 may comprise, as non-limiting examples, an email message, a text message, and/or a pop-up notification message to warn the developer 84 that manual intervention may be required with respect to the source code fragment in question.

Figure 4A:
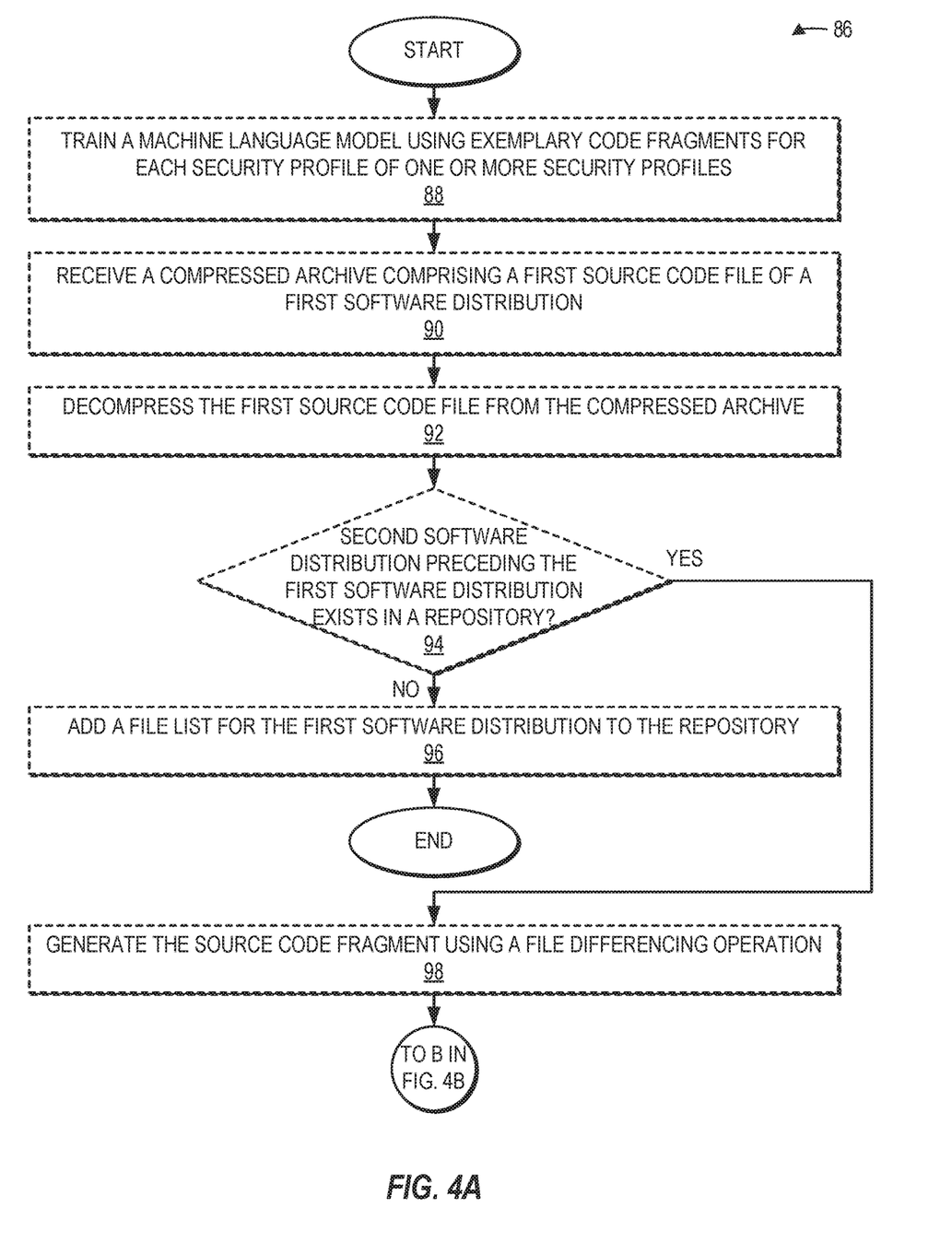
FIGS. 4A and 4B are flowcharts illustrating exemplary operations for providing automated security algorithm identification in software distributions, according to one example.
Figure 4B:
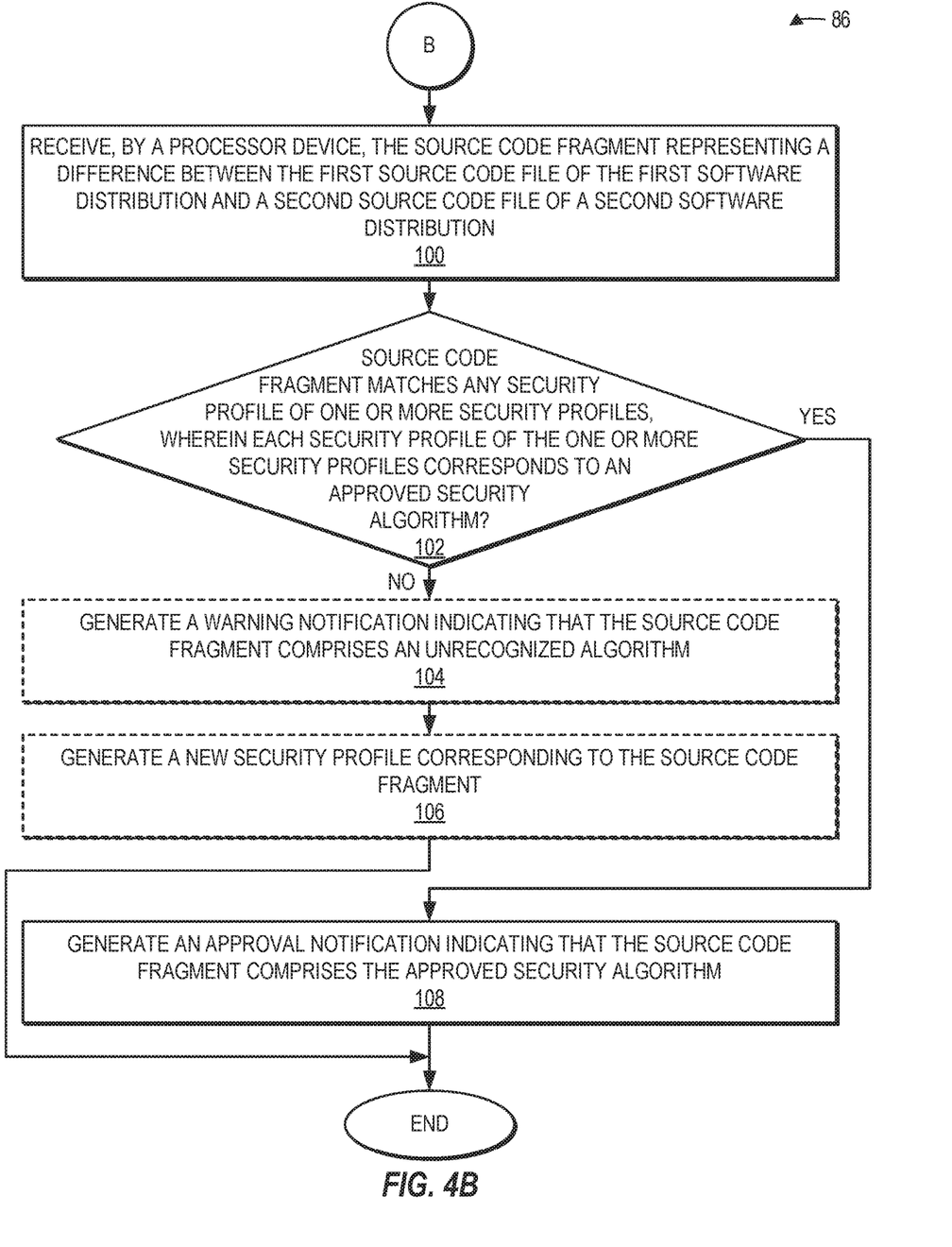

FIGS. 4A and 4B provide a flowchart 86 illustrating exemplary operations of the computing system 10 of FIG. 1 for providing automated security algorithm identification in software distributions, according to one example. For the sake of clarity, elements of FIGS. 1-3 are referenced in describing FIGS. 4A and 4B. In some examples, operations in FIG. 4A begin with the processor device 16 of FIG. 1 training the machine language model 28 using exemplary code fragments for each security profile of the one or more security profiles 26(0)-26(S) (block 88). The processor device 22 receives the compressed archive 38 comprising a first source code file, such as the source code file 34(1), of a first software distribution such as the software distribution 32(1) (block 90). The processor device 22 decompresses the first source code file 34(1) from the compressed archive 38 (e.g., using the decompress service 40) (block 92). The processor device 22 then determines whether a second software distribution, such as the software distribution 32(0), preceding the first software distribution 32(1) exists in the repository 30 (block 94). If not, the processor device 22 adds the file list 36(1) for the first software distribution 32(1) to the repository 30 (block 96). However, if the processor device 22 determines at decision block 94 that the second software distribution 32(0) does exist in the repository 30, the processor device 22 generates the source code fragment 48 using a file differencing operation (e.g., using the diff service 46 and the analysis service 44) (block 98). Operations then continue at block 100 of FIG. 4B.

Referring now to FIG. 4B, the processor device 16 next receives the source code fragment 48 representing a difference between the first source code file 34(1) of the first software distribution 32(1) and the second source code file 34(0) of the second software distribution 32(0) (block 100). The processor device 16 then determines whether the source code fragment 48 matches any security profile of the one or more security profiles 26(0)-26(S), wherein each security profile of the one or more security profiles 26(0)-26(S) corresponds to an approved security algorithm \ai\ (block 102). In some examples, the operations of block 102 for determining whether the source code fragment 48 matches any security profile of the one or more security profiles 26(0)-26(S) may comprise comparing an attribute of the source code fragment 48 with a corresponding attribute of each security profile of the one or more security profiles 26(0)-26(S). Some examples may provide that the operations of block 102 for determining whether the source code fragment 48 matches any security profile of the one or more security profiles 26(0)-26(S) comprises applying the machine language model 28 to the source code fragment 48.

If the processor device 16 determines at decision block 102 that the source code fragment 48 does not match any security profile of the one or more security profiles 26(0)-26(S), the processor device 16 generates a warning notification 52 indicating that the source code fragment 48 comprises an unrecognized algorithm (block 104). The processor device 16 in some examples may also generate a new security profile 26(i) corresponding to the source code fragment 48 (block 106). However, if the processor device 16 determines at decision block 102 that the source code fragment 48 does match any security profile of the one or more security profiles 26(0)-26(S), the processor device 16 generates an approval notification 50 indicating that the source code fragment 48 comprises the approved security algorithm (block 108).

Figure 5:
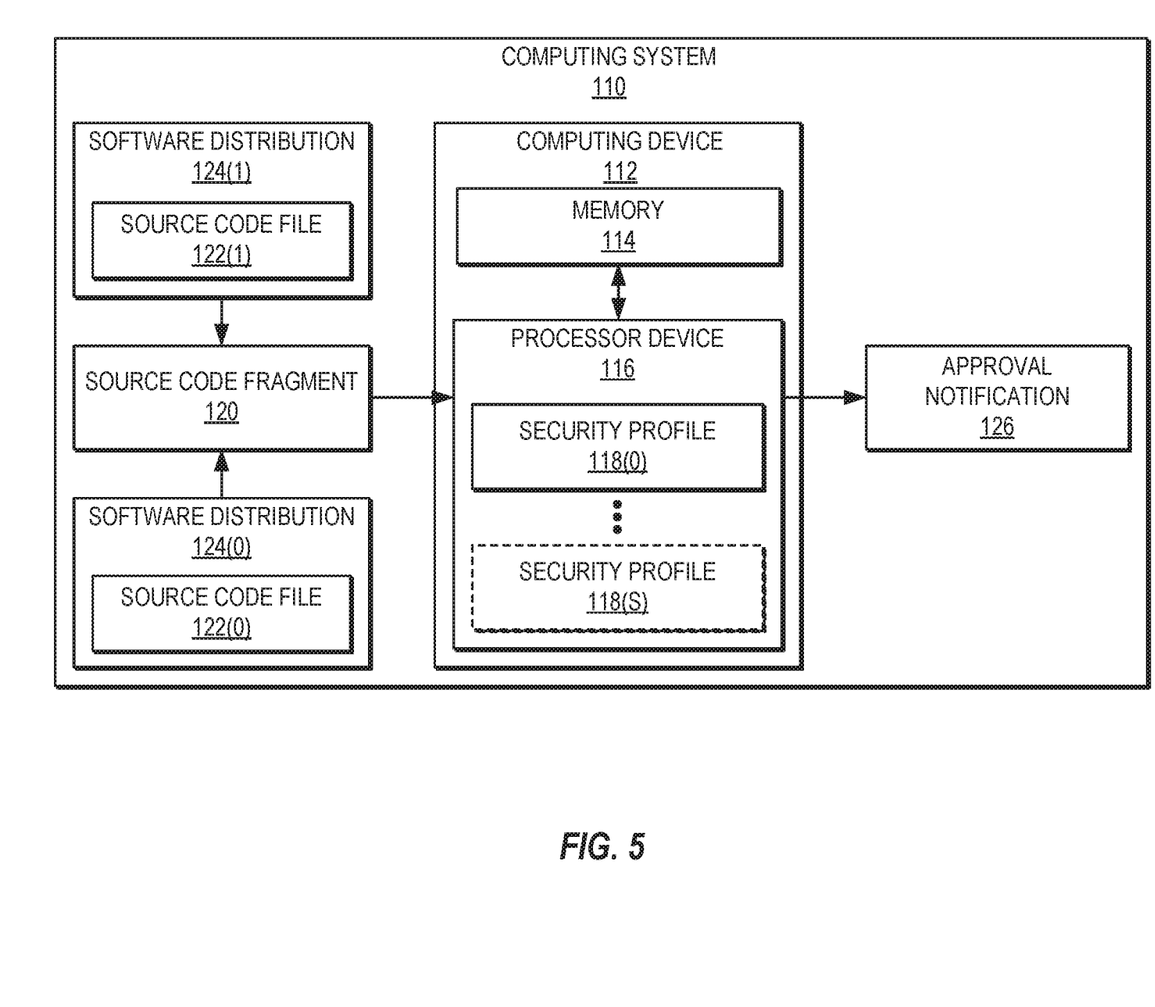
FIG. 5 is a simpler block diagram of the computing system of FIG. 1 for providing automated security algorithm identification in software distributions, according to one example.

To illustrate a simpler block diagram of the computing system 10 of FIG. 1 for providing automated security algorithm identification in software distributions according to one example, FIG. 5 is provided. In FIG. 5, a computing system 110 provides a computing device 112 (i.e., "first computing device 112") that includes a memory 114 and a processor device 116. The computing system 110 of FIG. 5 and the constituent elements thereof may encompass any one of known digital logic elements, semiconductor circuits, processing cores, and/or memory structures, among other elements, or combinations thereof. Examples described herein are not restricted to any particular arrangement of elements, and it is to be understood that some embodiments of the computing system 110 may include more or fewer elements than illustrated in FIG. 5.

As seen in FIG. 5, the processor device 116 provides one or more security profiles 118(0)-118(S), each corresponding to an approved security algorithm. In exemplary operation, the processor device 116 receives a source code fragment 120 representing the differences in source code between a source code file 122(0) of a software distribution 124(0) and a source code file 122(1) of a software distribution 124(1). The processor device 116 then determines whether the source code fragment 120 matches any security profile of the one or more security profiles 118(0)-118(S). If so, the processor device 116 generates an approval notification 126 that indicates that the source code fragment 120 comprises an approved security algorithm corresponding to one of the security profile(s) 118(0)-118(S).

Figure 6:
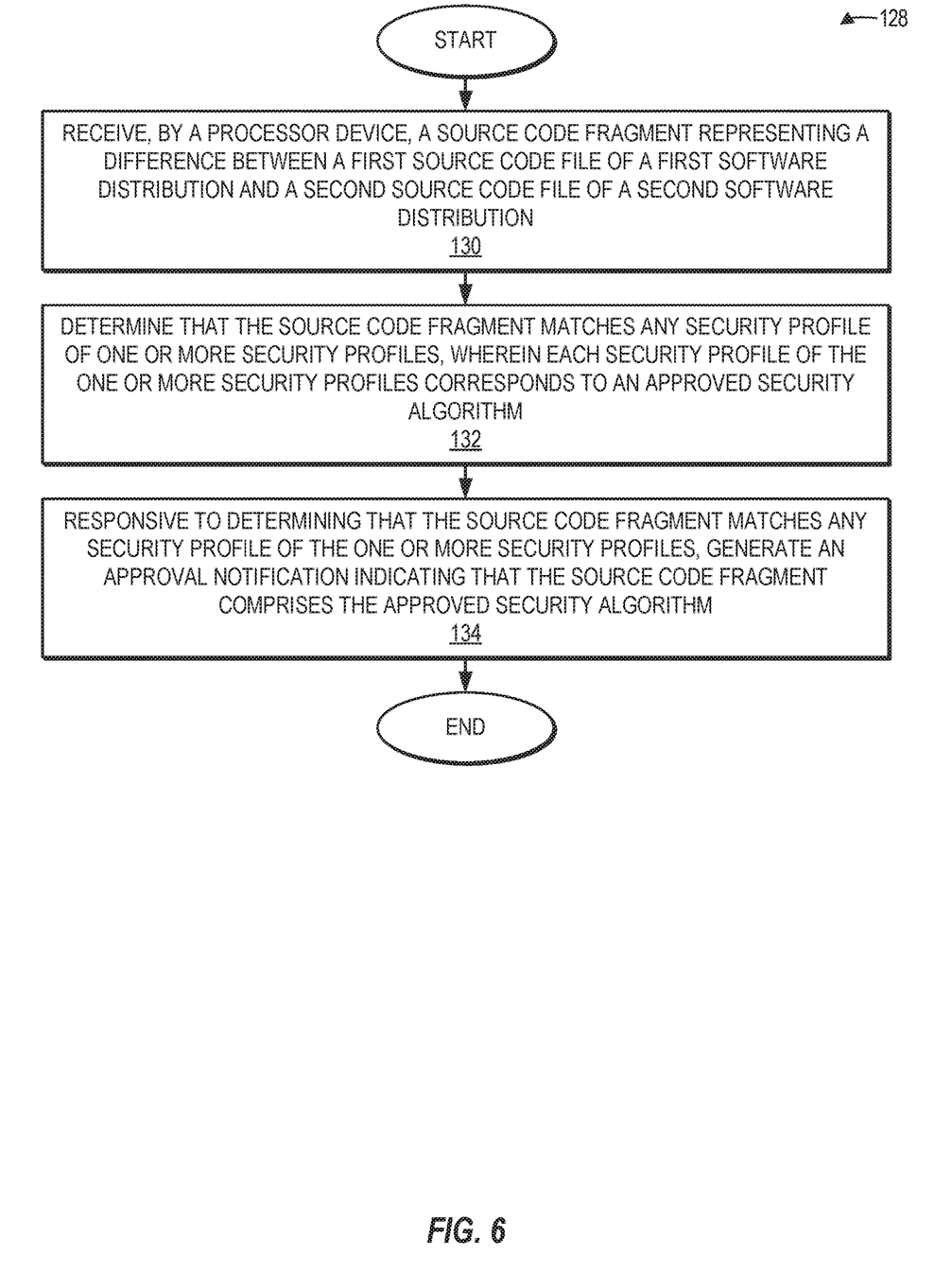
FIG. 6 is a flowchart of a simplified method for providing automated security algorithm identification in software distributions in the computing system of FIG. 5, according to one example.

FIG. 6 provides a flowchart 128 of a simplified method for providing automated security algorithm identification in software distributions in the computing system 110 of FIG. 5, according to one example. Elements of FIG. 5 are referenced in describing FIG. 6 for the sake of clarity. In FIG. 6, operations begin with the processor device 116 receiving the source code fragment 120 representing a difference between a first source code file of a first software distribution (such as the source code file 122(1) of the software distribution 124(1)) and a second source code file of a second software distribution (such as the source code file 122(0) of the software distribution 124(0)) (block 130). The processor device 116 determines that the source code fragment 120 matches any security profile of the one or more security profiles 118(0)-118(S), wherein each security profile of the one or more security profiles 118(0)-118(S) corresponds to an approved security algorithm (block 132). The processor device 116 then, responsive to determining that the source code fragment 120 matches any security profile of the one or more security profiles 118(0)-118(S), generates an approval notification 126 indicating that the source code fragment 120 comprises the approved security algorithm (block 134).

Figure 7:
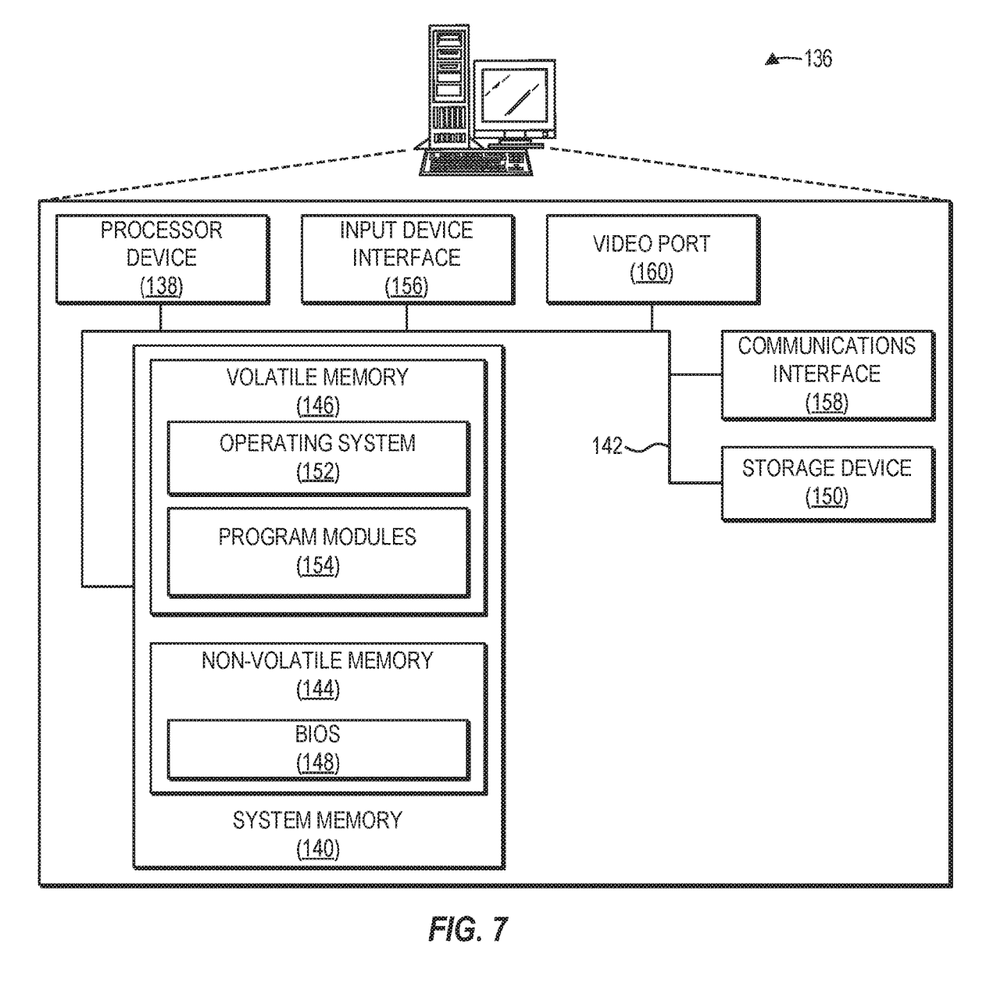
FIG. 7 is a block diagram of a computing device suitable for implementing examples, according to one example.

FIG. 7 is a block diagram of a processor-based computing device 136 ("computing device 136"), such as the computing device 12 of FIG. 1 or the computing device 112 of FIG. 5, suitable for implementing examples according to one example. The computing device 136 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 136 includes a processor device 138, a system memory 140, and a system bus 142. The system bus 142 provides an interface for system components including, but not limited to, the system memory 140 and the processor device 138. The processor device 138 can be any commercially available or proprietary processor.

The system bus 142 may be any of several types of bus structures that may further interconnect to a memory bus (with or without a memory controller), a peripheral bus, and/or a local bus using any of a variety of commercially available bus architectures. The system memory 140 may include non-volatile memory 144 (e.g., read-only memory (ROM), erasable programmable ROM (EPROM), electrically EPROM (EEPROM), etc.), and volatile memory 146 (e.g., RAM). A basic input/output system (BIOS) 148 may be stored in the non-volatile memory 144 and can include the basic routines that help to transfer information among elements within the computing device 136. The volatile memory 146 may also include a high-speed RAM, such as static RAM, for caching data.

The computing device 136 may further include or be coupled to a non-transitory computer-readable storage medium such as a storage device 150, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 150 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 150 and in the volatile memory 146, including an operating system 152 and one or more program modules 154 which may implement the functionality described herein in whole or in part. It is to be appreciated that the examples can be implemented with various commercially available operating systems 152 or combinations of operating systems 152. All or a portion of the examples may be implemented as a computer program product stored on a transitory or non-transitory computer-usable or computer-readable storage medium, such as the storage device 150, which includes complex programming instructions, such as complex computer-readable program code, to cause the processor device 138 to carry out the steps described herein. Thus, the computer-readable program code can comprise software instructions for implementing the functionality of the examples described herein when executed on the processor device 138. The processor device 138 may serve as a controller, or control system, for the computing device 136 that is to implement the functionality described herein.

An operator may also be able to enter one or more configuration commands through a keyboard (not illustrated), a pointing device such as a mouse (not illustrated), or a touch-sensitive surface such as a display device (not illustrated). Such input devices may be connected to the processor device 138 through an input device interface 156 that is coupled to the system bus 142 but can be connected by other interfaces, such as a parallel port, an Institute of Electrical and Electronic Engineers (IEEE) 13138 serial port, a Universal Serial Bus (USB) port, an IR interface, and the like.

The computing device 136 may also include a communications interface 158 suitable for communicating with a network as appropriate or desired. The computing device 136 may also include a video port 160 to interface with a display device to provide information to a user.

Individuals will recognize improvements and modifications to the preferred examples of the disclosure. All such improvements and modifications are considered within the scope of the concepts disclosed herein and the claims that follow.

What is claimed is:

1. A method, comprising:
   receiving, by a first processor device, a first source code fragment representing a difference between a first source code file of a first software distribution and a second source code file of a second software distribution;
   determining that the first source code fragment matches any security profile of one or more security profiles, wherein each security profile of the one or more security profiles corresponds to an approved security algorithm; and
   responsive to determining that the first source code fragment matches any security profile of the one or more security profiles, generating an approval notification indicating that the first source code fragment comprises the approved security algorithm.

2. The method of claim 1, further comprising:
   receiving a second source code fragment representing a difference between a third source code file of a third software distribution and a fourth source code file of a fourth software distribution;
   determining that the second source code fragment does not match any security profile of the one or more security profiles; and
   responsive to determining that the second source code fragment does not match any security profile of the one or more security profiles, generating a warning notification indicating that the second source code fragment comprises an unrecognized algorithm.

3. The method of claim 2, further comprising, responsive to determining that the second source code fragment does not match any security profile of the one or more security profiles, generating a new security profile corresponding to the second source code fragment.

4. The method of claim 2, wherein the warning notification comprises one or more of an automated notification to a CI system and an automated communication to a developer.

5. The method of claim 1, wherein the approval notification comprises an automated notification to a continuous integration (CI) system.

6. The method of claim 1, wherein each security profile of the one or more security profiles comprises one or more of:
   an identifier of the approved security algorithm;
   a classification of the approved security algorithm;
   an exemplary code fragment of the approved security algorithm;
   a programming language identifier indicating a programming language in which the exemplary code fragment of the approved security algorithm is implemented; and
   a programming paradigm identifier indicating a programming paradigm in which the exemplary code fragment of the approved security algorithm is implemented.

7. The method of claim 1, wherein the second software distribution precedes the first software distribution.

8. The method of claim 7, further comprising:
   receiving a compressed archive comprising the first source code file of the first software distribution;
   decompressing the first source code file from the compressed archive;
   determining that the second software distribution preceding the first software distribution exists in a repository; and
   responsive to determining that the second software distribution exists in the repository, generating the first source code fragment using a file differencing operation.

9. The method of claim 1, wherein determining that the first source code fragment matches any security profile of the one or more security profiles comprises comparing an attribute of the first source code fragment with a corresponding attribute of each security profile of the one or more security profiles.

10. The method of claim 1, further comprising training a machine language model using exemplary code fragments for each security profile of the one or more security profiles;
    wherein determining that the first source code fragment matches any security profile of the one or more security profiles comprises applying the machine language model to the source code fragment.

11. A computing system, comprising:
    a first computing device comprising a first memory and a first processor device coupled to the first memory, the first processor device to:
    receive a first source code fragment representing a difference between a first source code file of a first software distribution and a second source code file of a second software distribution;
    determine that the first source code fragment matches any security profile of one or more security profiles, wherein each security profile of the one or more security profiles corresponds to an approved security algorithm; and
    responsive to determining that the first source code fragment matches any security profile of the one or more security profiles, generate an approval notification indicating that the first source code fragment comprises the approved security algorithm.

12. The computing system of claim 11, wherein the first processor device is further to:
  receive a second source code fragment representing a difference between a third source code file of a third software distribution and a fourth source code file of a fourth software distribution;
  determine that the second source code fragment does not match any security profile of the one or more security profiles; and
  responsive to determining that the second source code fragment does not match any security profile of the one or more security profiles, generate a warning notification indicating that the second source code fragment comprises an unrecognized algorithm.

13. The computing system of claim 12, wherein the processor device is further to, responsive to determining that the second source code fragment does not match any security profile of the one or more security profiles, generate a new security profile corresponding to the second source code fragment.

14. The computing system of claim 12, wherein the warning notification comprises one or more of an automated notification to a CI system and an automated communication to a developer.

15. The computing system of claim 11, wherein the approval notification comprises an automated notification to a continuous integration (CI) system.

16. The computing system of claim 11, wherein each security profile of the one or more security profiles comprises one or more of:
  an identifier of the approved security algorithm;
  a classification of the approved security algorithm;
  an exemplary code fragment of the approved security algorithm;
  a programming language identifier indicating a programming language in which the exemplary code fragment of the approved security algorithm is implemented; and
  a programming paradigm identifier indicating a programming paradigm in which the exemplary code fragment of the approved security algorithm is implemented.

17. The computing system of claim 11, wherein the second software distribution precedes the first software distribution.

18. The computing system of claim 17, further comprising:
  a second computing device comprising a second memory and a second processor device coupled to the memory, the second processor device to:
    receive a compressed archive comprising the first source code file of the first software distribution;
    decompress the first source code file from the compressed archive;
    determine that the second software distribution preceding the first software distribution exists in a repository; and
    responsive to determining that the second software distribution exists in the repository, generate the first source code fragment using a file differencing operation.

19. The computing system of claim 11, wherein to determine that the first source code fragment matches any security profile of the one or more security profiles is to compare an attribute of the first source code fragment with a corresponding attribute of each security profile of the one or more security profiles.

20. A computer program product stored on a non-transitory computer-readable storage medium and including instructions to cause a processor device to:
  receive a first source code fragment representing a difference between a first source code file of a first software distribution and a second source code file of a second software distribution;
  determine that the first source code fragment matches any security profile of one or more security profiles, wherein each security profile of the one or more security profiles corresponds to an approved security algorithm; and
  responsive to determining that the first source code fragment matches any security profile of the one or more security profiles, generate an approval notification indicating that the first source code fragment comprises the approved security algorithm.

* * * * *